United States Patent
Fletcher et al.

(10) Patent No.: US 7,054,844 B2
(45) Date of Patent: May 30, 2006

(54) SECURE ELECTRONIC PROCUREMENT SYSTEM AND METHOD

(75) Inventors: Robert J. Fletcher, Mississauga (CA); Neil C. McPhedran, Oakville (CA)

(73) Assignee: BCE Emergis Inc., Montreal (CA)

( * ) Notice: Subject to any disclaimer, the term of this patent is extended or adjusted under 35 U.S.C. 154(b) by 511 days.

(21) Appl. No.: 09/755,467

(22) Filed: Jan. 5, 2001

(65) Prior Publication Data

US 2001/0042050 A1 Nov. 15, 2001

Related U.S. Application Data

(60) Provisional application No. 60/174,510, filed on Jan. 5, 2000.

(51) Int. Cl.
*G06F 17/60* (2006.01)

(52) U.S. Cl. .............................. 705/75; 705/1; 705/22; 705/26; 705/28; 705/35; 705/64; 705/78

(58) Field of Classification Search ................. 705/1, 705/22, 26, 28, 35, 64, 75, 50, 54, 25
See application file for complete search history.

(56) References Cited

U.S. PATENT DOCUMENTS

| | | | | |
|---|---|---|---|---|
| 5,727,165 A | * | 3/1998 | Ordish et al. ................. | 705/37 |
| 5,758,095 A | * | 5/1998 | Albaum et al. ................ | 705/2 |
| 5,960,411 A | * | 9/1999 | Hartman et al. ............... | 705/26 |
| 5,970,475 A | | 10/1999 | Barnes et al. ................. | 705/27 |
| 6,260,024 B1 | * | 7/2001 | Shkedy ......................... | 705/37 |
| 6,330,551 B1 | * | 12/2001 | Burchetta et al. ............. | 705/80 |
| 6,341,353 B1 | * | 1/2002 | Herman et al. ............... | 713/201 |
| 6,598,027 B1 | * | 7/2003 | Breen et al. ................... | 705/26 |
| 6,714,918 B1 | * | 3/2004 | Hillmer et al. ............... | 705/18 |
| 6,847,953 B1 | * | 1/2005 | Kuo ............................. | 705/75 |

FOREIGN PATENT DOCUMENTS

JP   08137970 A   *   5/1996

OTHER PUBLICATIONS

"Exporter, protect thyself?" Gooley, Toby B., Logistics Management & Distribution Report v38n5 P91-94, May 1999.*

*Electronic Ordering of Controlled Substances* (Interim Guidelines), published by the Minister of National Health, 1999, 8 pages.

*Guide to Threat and Risk Assessment For Information Technology*, Security Information Publication, Nov. 5, 1994, 42 pages.

* cited by examiner

*Primary Examiner*—James P. Trammell
*Assistant Examiner*—Calvin L Hewitt, II
(74) *Attorney, Agent, or Firm*—Kusner & Jaffe

(57) ABSTRACT

A secure electronic procurement system allows a user (e.g. pharmacist) to order and confirm receipt electronically over a network (e.g. Internet) goods normally subject to a verifiable chain of custody (e.g. narcotics, controlled drugs and substances, other public distribution regulated goods or valuables). The system includes hardware and software for a user device, a secure procurement system, a supplier system and a certificate authority to authenticate communications, particularly user orders and confirmed receipts. The supplier system may be a legacy EDI based order system. Copies of electronic orders, shipping notices and receipts confirming shipment received together with digital signatures are securely stored for audit trail purposes. Business rules within the secure procurement system operate to ensure proper adherence to the chain of custody.

31 Claims, 16 Drawing Sheets

SECURE ELECTRONIC PROCUREMENT SYSTEM AND METHOD

CROSS REFERENCE TO A RELATED APPLICATION

This application claims the benefit of U.S. Provisional Application No. 60/174,510 filed Jan. 5, 2000.

TECHNICAL FIELD

The invention relates to electronic commerce (e-commerce) and a system and method for the secure electronic procurement of goods or services particularly narcotics, controlled drugs and substances or other goods generally subject to a "chain of custody" for ordering and delivering.

BACKGROUND OF THE INVENTION

Definition of E-commerce

E-commerce is the electronic exchange of commercial information between business to business (B2B) or between business to customers (B2C). The exchange includes commercial information sent via email and websites, and also information sent through traditional communication channels such as Value Added Networks (VANs).

Limitations of Traditional E-commerce: VAN-based EDI

Electronic Data Interchange (EDI) refers to the exchange of electronic business data, such as purchase orders and invoices, between computer applications. A goal of the exchange is to eliminate paper and human intervention. EDI requires a network connection between two trading partners exchanging business documentation. Traditionally, this connection has required a dedicated leased line or a dialup connection to a VAN. Through standardization, EDI allows all suppliers and their trading partners to link their computing infrastructures without worrying about the differences in their respective organizations and technology system architectures.

EDI has resulted in significant competitive advantages and benefits to its users, including lower costs, better responsiveness to customers, improved distribution and production channel management, reduced cycle times, better access to transaction status and reduced payment cycles. However, EDI exists only in situations where trading partners send and receive large numbers of EDI documents on a regular basis, with enough volume to justify the substantial costs associated with establishing a dedicated VAN system. Such large users have been prevented from doing business electronically with smaller companies that cannot afford EDI. For many small and mid-sized companies, the necessary investments in EDI hardware and software and monthly VAN connection fees make EDI cost-prohibitive.

Limitations of Manual Ordering Processes

To overcome these shortcomings, large and small organizations are being forced to utilize manual ordering processes for some of their customers, in a manner very similar to the way smaller firms conduct business. The average cost to process a document in a manual environment ranges anywhere from U.S.$50 to U.S.$75. These costs include labor, materials and estimates for the inherent flaws that exist in manual ordering processes such as:

Possibility of losing the order itself;

Possibility of re-keying errors;

Delivery delays due to slower processes;

Inability of customer to check order status;

Inability of customer to check shipment accuracy; and

Inability of customer at time of order to determine price changes, obsolete inventory status and product availability.

Limitations of HTML-based Internet Ordering Processes

Much of the information required for e-commerce is already resident on the Web as it is by far the largest repository of information in the world. However, much of this information is maintained in hypertext mark-up language, or HTML documents.

HTML, due to its inherent ability to hyperlink, is the essential technology that launched the Web. Although HTML has many advantages for the user, it also has many limitations, the most significant of these being that there is no standard mechanism to describe data maintained in HTML. Consequently, users or computer applications do not have a structured way to query and manipulate the data contained in HTML documents.

Orders may be received electronically via the Internet but because they are received as "structure-less" documents, orders must be manually re-keyed into legacy systems for further processing and fulfillment.

Eliminating the E-commerce Bottleneck

Today, EDI is primarily used by large organizations dealing with other large organizations. Any business entity that wishes to conduct business with smaller clients must utilize other ordering methods. The Internet does not yet represent the perfect solution because it does not enable orders to be automatically processed by legacy systems due to the shortcomings of HTML.

Procuring Goods Requiring a Verifiable Chain of Custody

In contrast to many goods, the possession and distribution of narcotics, controlled drugs and substances are controlled in the public interest typically to prevent misuse or abuse. The purchase and sale of such goods among, for example, manufacturer, licensed dealer, value-added supplier and pharmacist or other qualified practitioner is typically regulated to facilitate secure ordering and accountability. In Canada, the industry is federally controlled by the Minister of National Health and the Health Protection Branch of Health Canada. In the United States, federal regulation is primarily the responsibility of the Drug Enforcement Agency (DEA).

The central issue with respect to an ordering system for narcotics, controlled drugs and substances is the prevention of diversion and loss. The historical regulatory framework for ordering and delivering of such substances mandates a "chain of custody" approach in a paper environment for authentication and verification. At all times, the controlled goods are considered to be the responsibility of the qualified person who has last signed for the goods at the time of a change in custody. For example, in order that a licensed dealer may fill an order for a narcotic, controlled drug or controlled substance from a pharmacist, it is the responsibility of the licensed dealer to authenticate the person to whom the goods are being transferred. The licensed dealer must also verify that the person has ordered the particular goods in the particular quantity to be transferred. It is further a necessity for the licensed dealer to ensure, upon delivery, that the person making the order acknowledges its receipt in a timely manner.

By means of signed and dated written orders and receipts, as well as record retention, licensed dealers may supply and pharmacists and other practitioners may receive narcotics, controlled drugs and substances.

It is desirable to facilitate electronic procurement of such goods over a communications network such as the Internet to take advantage of efficiencies achieved with e-commerce, particularly EDI systems, as previously discussed. A proposed electronic system must provide levels of assurance at least as effective as that offered by current primarily paper-based systems. Such an electronic ordering system should comply with any applicable regulatory requirements.

Ideally, an electronic ordering system must provide means to authenticate and verify orders and be limited to use for electronic ordering only by qualified persons (e.g. pharmacists). The electronic ordering system must provide an equivalent to a "signed receipt" confirming receipt of the drugs ordered and the system must be able to produce reports for audit purposes.

A threat risk assessment of the electronic system is also recommended. The assessment may be carried out in accordance with *Guide to Threat Risk Assessment for Information Technology, November* 1994 from the Royal Canadian Mounted Police. The Threat Risk Assessment must address the following areas:

User Security:
  Due diligence process to validate identity of pharmacist;
  Authentication of the ownership of digital certificate;
  Safeguarding the validity of personal identification codes;
  Safeguard against loss of personal identification codes.
System Security:
  Protection of private encryption keys;
  Safeguards against tampering with (ship-to address, amounts shipped);
  Confirmation of receipt of order.
Database Security:
  Security of internal system database against tampering.
Encryption and Backup:
  Methods used and reliability;
  Certification Authority.
Physical Security:
  Web Server—source code security and redundancy.
Network (Internet) Security:
  Safeguards against unauthorized user access.

One example of an e-commerce system for processing business transactions is disclosed in U.S. Pat. No. 5,970,475 for an Electronic Procurement System and Method for Trading Partners issued Oct. 19, 1999 of Barnes et al. The patent discloses a plurality of users within a trading organization to procure goods or services from pre-determined suppliers. Each user is assigned a level of authorization by an administrator at the organization that limits the nature of the goods/services that may be ordered. The system also allows for automated payments from a financial institution upon delivery. The system does not address the particular requirements for procuring goods requiring a chain of custody such as narcotics or other controlled substances. There is no concern in Barnes et al. for diversion or loss of goods ordered.

SUMMARY OF THE INVENTION

It is an object of the invention to provide a secure electronic procurement system and method providing a verifiable chain of custody.

In accordance with an embodiment of the invention there is provided an electronic commerce system for procuring goods/services subject to a chain of custody when transferred from a supplier to a user. The system comprises three main components, namely a user system, a secure procurement system and a supplier system. The user system for procuring the goods by the user comprises means for electronically receiving and transmitting user private procurement transactions; and security means operable only by the user for authenticating electronically the user private procurement transactions (comprising orders and confirmations of receipt) in a non-repudiatable manner to the secure procurement processor.

The supplier system for supplying the goods for procuring by the user comprises means for electronically receiving authenticated user private procurement transactions and means for transmitting supplier private procurement transactions. The supplier private procurement transactions comprise a notification of provision of goods/services.

The secure procurement system comprises user system communication means for transmitting and receiving the user private procurement transactions with the user system; supplier system communication means for transmitting and receiving the supplier private procurement transactions with the supplier system. Security means are also provided for receiving the authentication of the user private procurement transactions and for authenticating electronically in a non-repudiatable manner the user private procurement transactions (comprising orders and confirmations of receipt) as the secure procurement system's transactions. Also provided is a database server for storing the authenticated private procurement transactions and for storing a product catalog representing the goods from the supplier available for procuring by a user; and, a procurement transaction processor for processing the private procurement transactions transmitted and received between the user and the supplier.

Also included in the electronic commerce system, according to the embodiment, is a certificate authority for facilitating the authentication electronically of the user private procurement transactions comprising orders and confirmations of receipt in a non-repudiatable manner; a network connection linking the user system, secure procurement system and certificate authority; and a supplier network connection linking the supplier system and secure procurement system.

In accordance with the e-commerce system of the present invention, the secure procurement system, in cooperation with the certificate authority, processes and stores orders, notifications, and confirmations of receipt to provide a verifiable chain of custody for goods/service procured by the user.

In accordance with a further aspect of the invention the procurement transaction processor comprises means for performing business rules analysis using the order, notification or confirmation of receipt; and means for alarming potential instances of diversion or loss of goods/services. The means for performing business rules analysis and means for alarming are preferably configured to: upon receiving a notification of provision of goods/services at the secure procurement system, initiate a timer for a predetermined period of time within which to receive the confirmation of receipt corresponding to the notification; if the timer expires, alarm a potential instance of diversion or loss of goods/services and prevent further orders from the user.

When the notification of provision includes a count of the quantity of the goods/services provided and the confirmation of receipt includes a count of the quantity of the goods/services received, the means for performing business rules analysis and means for alarming are preferably configured to: upon receiving the confirmation of receipt at the secure procurement system, compare the count from the confirmation of receipt to the count from the corresponding notification and if there is a discrepancy, alarm a potential instance of diversion or loss of goods/services.

In accordance with an aspect of the invention the user system security means includes a certificate from the certificate authority for authenticating user to the secure procurement system and the secure procurement system security means includes a certificate from the certificate authority for authenticating the secure procurement system to the user.

Preferably, the certificate authority comprises means for generating encryption/decryption key pairs unique to each user and the secure procurement system to enable encryption/decryption, integrity and authentication of transmitted user private procurement transactions between the user and secure procurement systems. The supplier system includes means for processing user orders and may include means to interface to a legacy supplier order system.

To further reduce opportunity for diversion or loss, the supplier system includes a database for storing the user's ship to address for provision of said goods/services to the user. Any user ship to address in the user order is ignored during processing by the supplier system.

BRIEF DESCRIPTION OF THE DRAWINGS

Further features and advantages of the present invention will become apparent from the following detailed description taken in combination with the appended drawings, in which.

It is noted that throughout the appended drawings, like features are identified by like reference numerals.

DETAILED DESCRIPTION OF PREFERRED EMBODIMENTS

Figure 1:
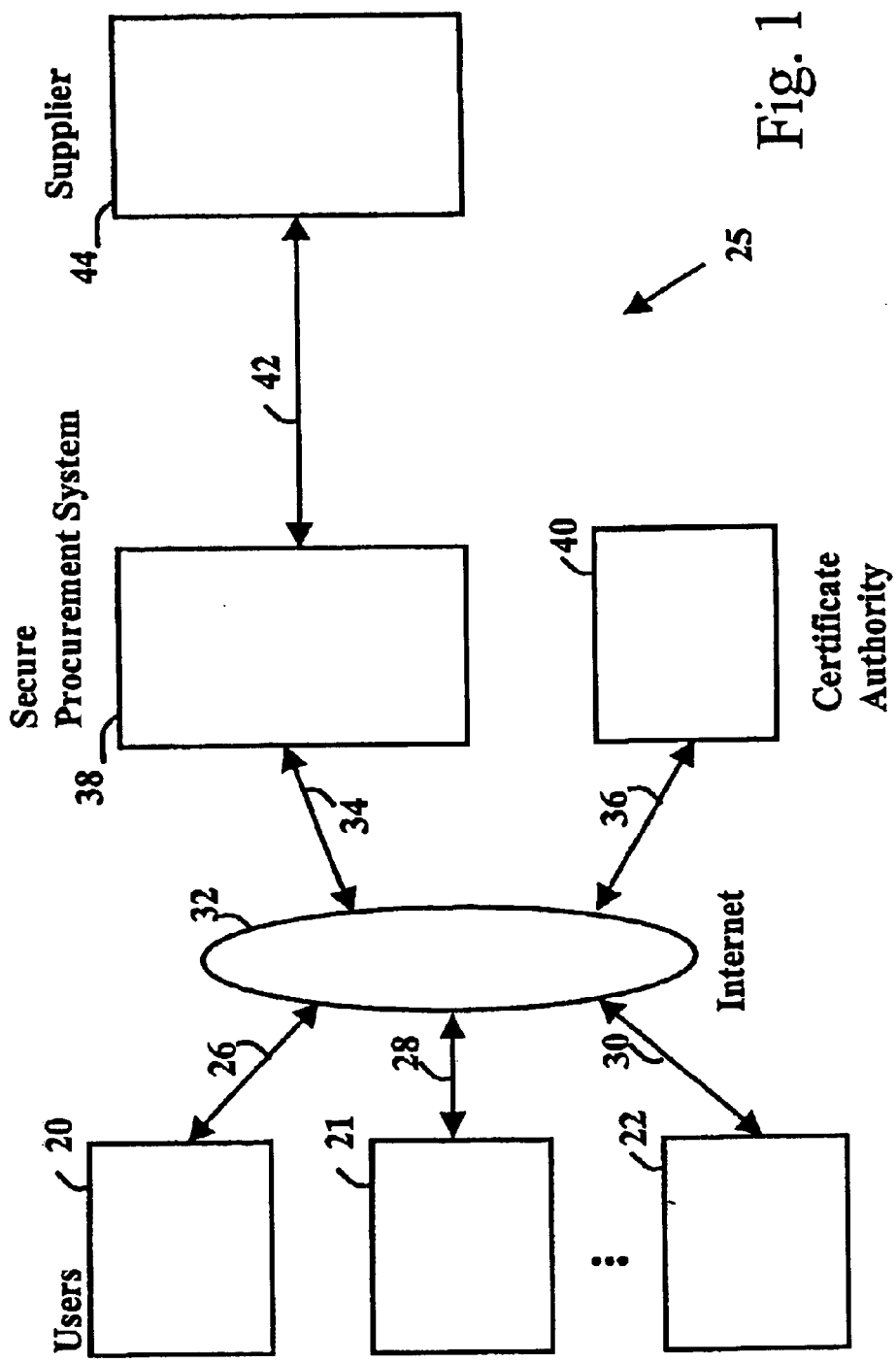
FIG. 1 is a general schematic representation of the e-commerce system demonstrating the major participants and relationship among them in accordance with an embodiment of the invention.

Referring to FIG. 1, there is shown an embodiment of an e-commerce system in accordance with the present invention for the secure electronic procurement of goods. The system is primarily suited for procuring goods requiring a verifiable chain of custody such as narcotics, controlled drugs and substances by pharmacists and other practitioners from licensed dealers. Additional goods that may take advantage of a chain of custody approach are goods of high value such as securities, precious metals, jewelry or the like or other public distribution regulated goods such as firearms. However, it is understood that the system may also be used to purchase other goods or services that may be offered by suppliers or sellers such as office supplies, books or other catalog order products.

According to an embodiment of the invention, the system, generally designated by reference number 25, comprises a plurality of user systems 21, 22, and 23 each connected through respective network connections 26, 28 and 30 to a network 32 (eg. Internet) for communication with a Secure Procurement System (SPS) 38. SPS 38 is connected to the Internet 32 via network connection 34 and connected to a Supplier system 44 via a supplier network connection 42. A Certificate Authority (CA) system 40 is also connected to the Internet 32 to authenticate communications as will be explained further below. System 25 permits a user such as a pharmacist to send digitally signed and secured orders over the Internet 32 for products such as narcotics or controlled substances from a supplier as discussed further below.

The Internet 32 is presently the preferred network for communication among a user system 21, 22 or 23 and SPS 38 and CA 40 due to its public availability at a relatively low cost. The communications link 42 is preferably a private link such as an EDI VAN, a virtual private network (VPN) or other communications link. While only a single supplier 44 is illustrated, it is understood that system 25 may be scaled for multiple suppliers particularly if supplier 44 is a value added supplier (VAS) representing many source suppliers.

Figure 2:
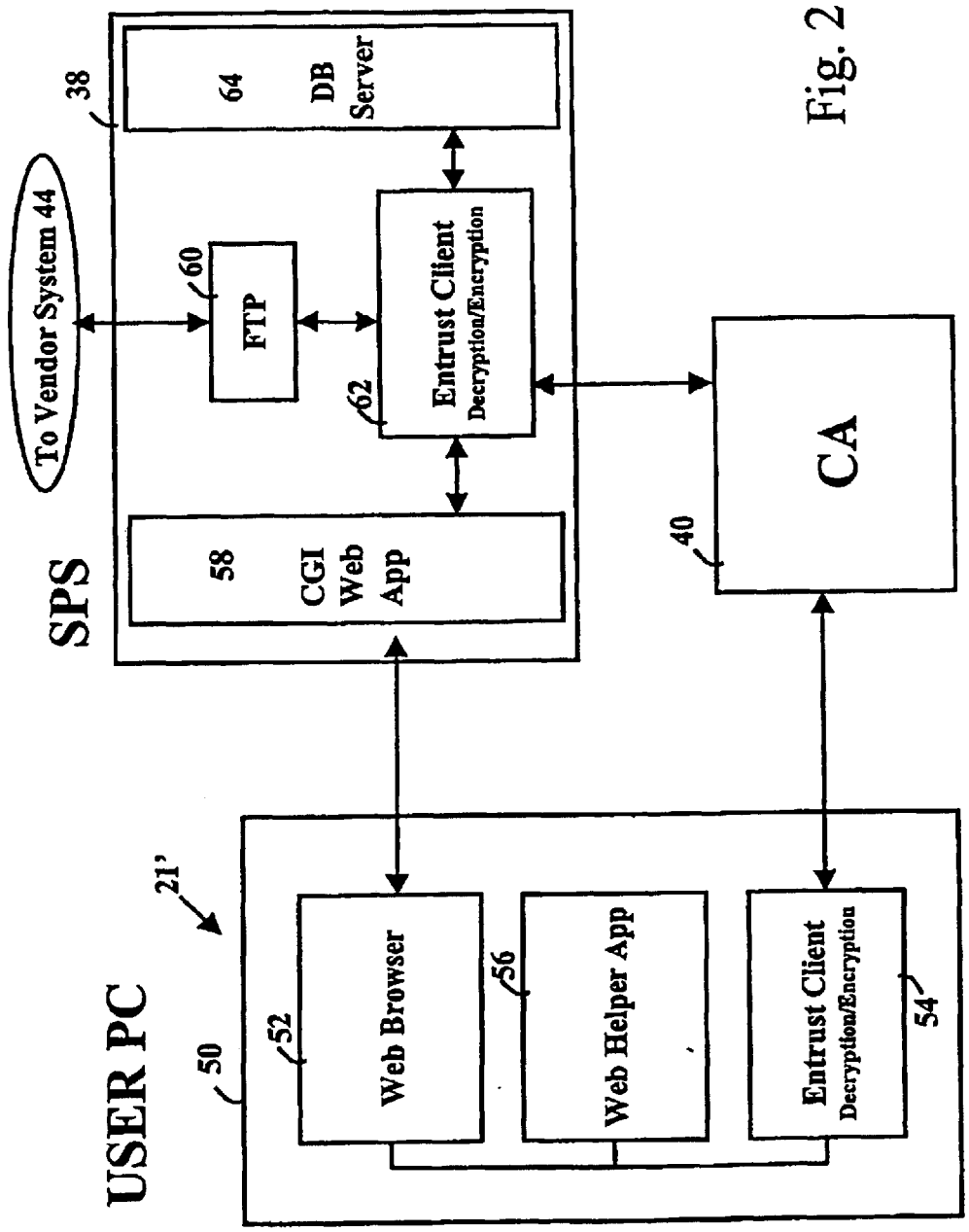
FIG. 2 is a general schematic representation of a user system, secure procurement system and Certificate Authority in accordance with a preferred embodiment of the invention.
Figure 4:
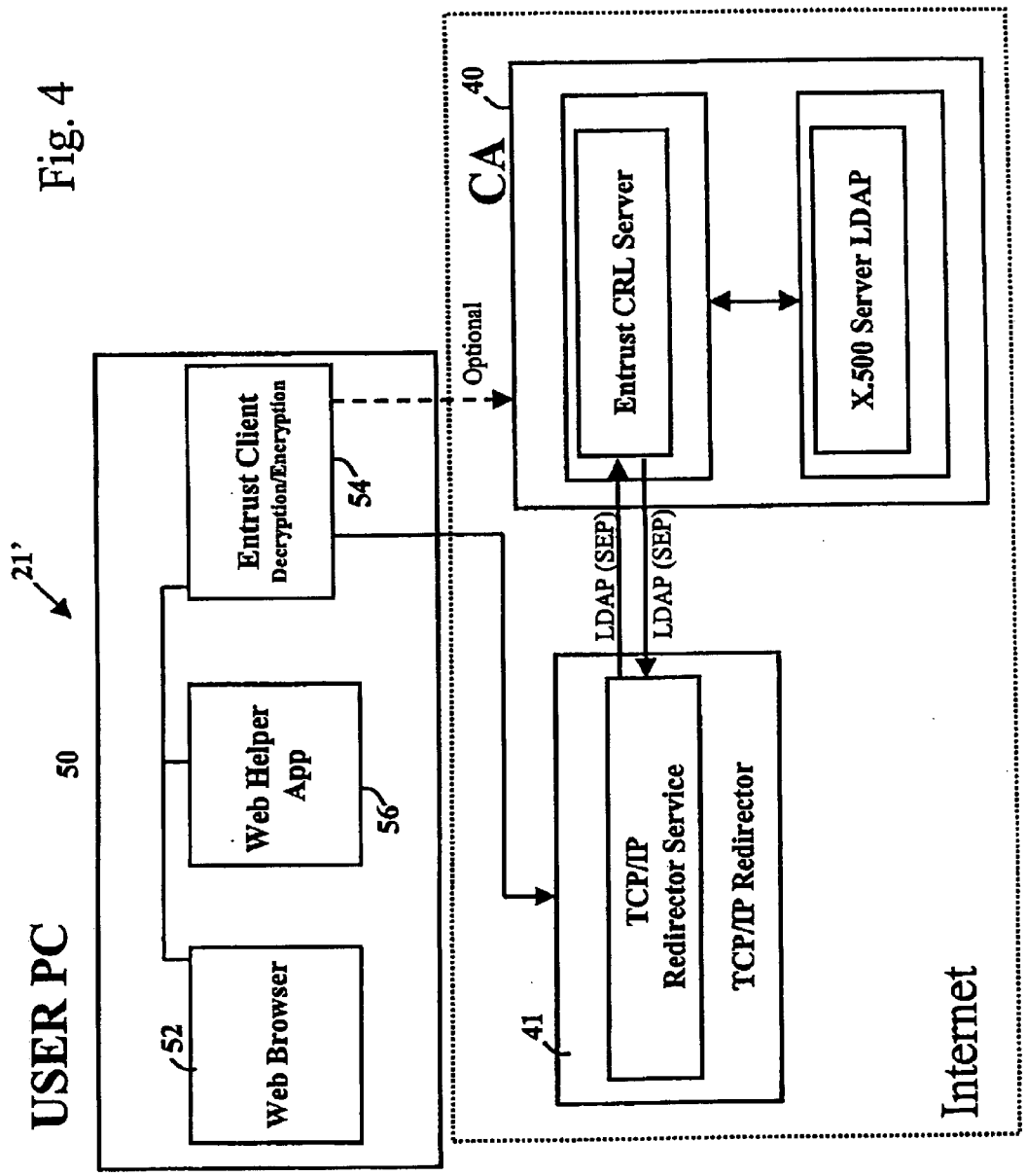
FIG. 4 is a flowchart demonstrating the method by which an Entrust User Certificate is created.
Figure 5A:
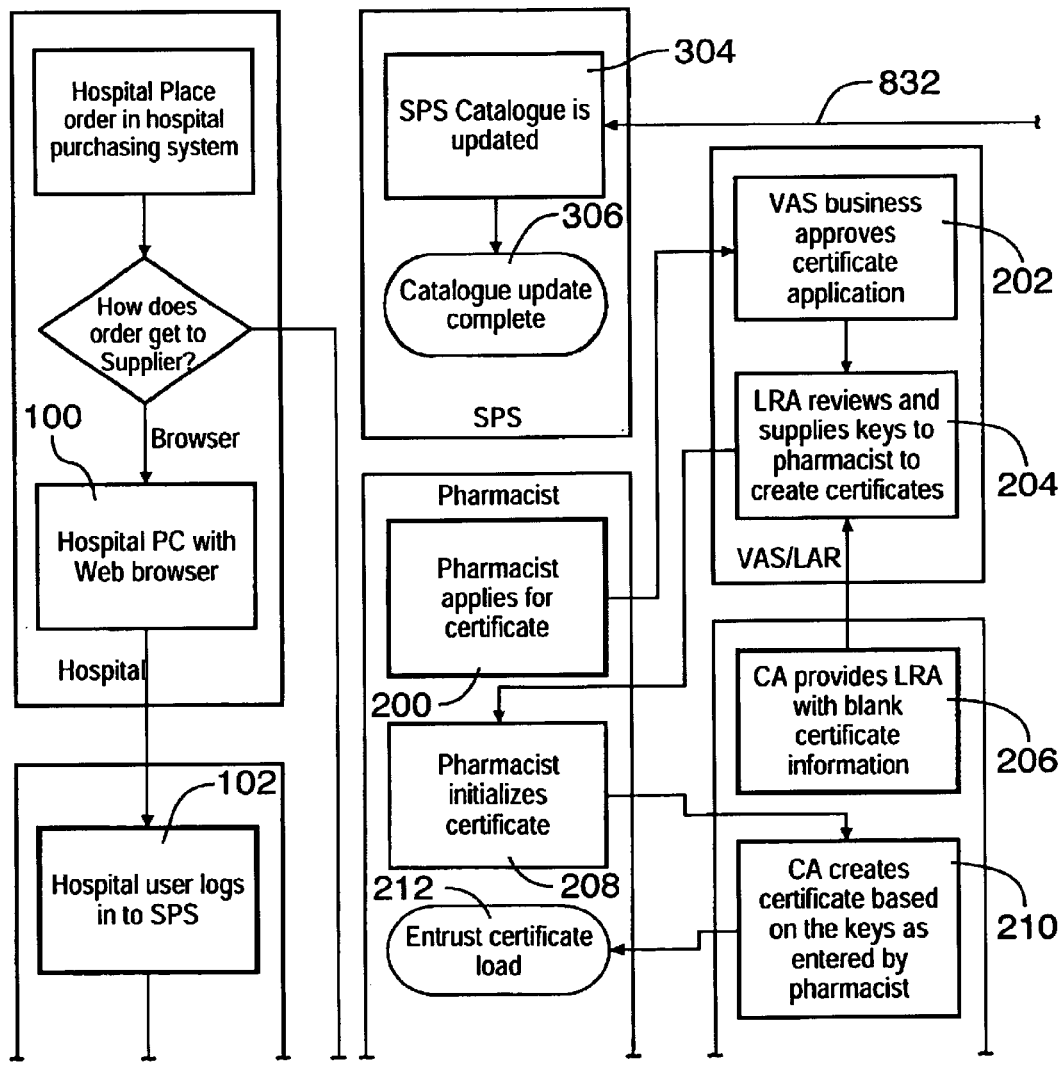
FIGS. 5A–5D illustrate a high level flowchart demonstrating the functionality of the preferred embodiment of FIG. 2 and FIG. 3.
Figure 5B:
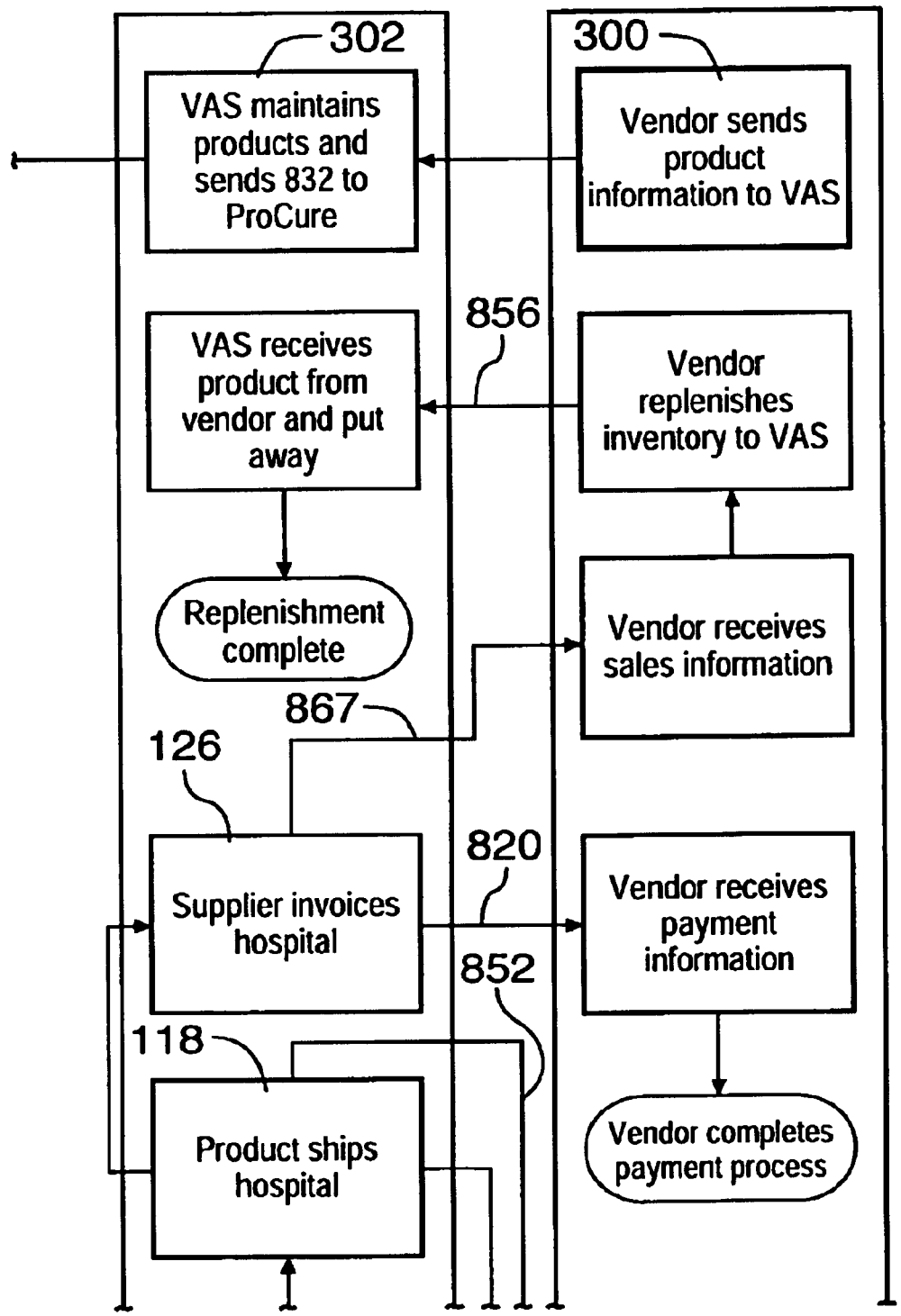
Figure 5C:
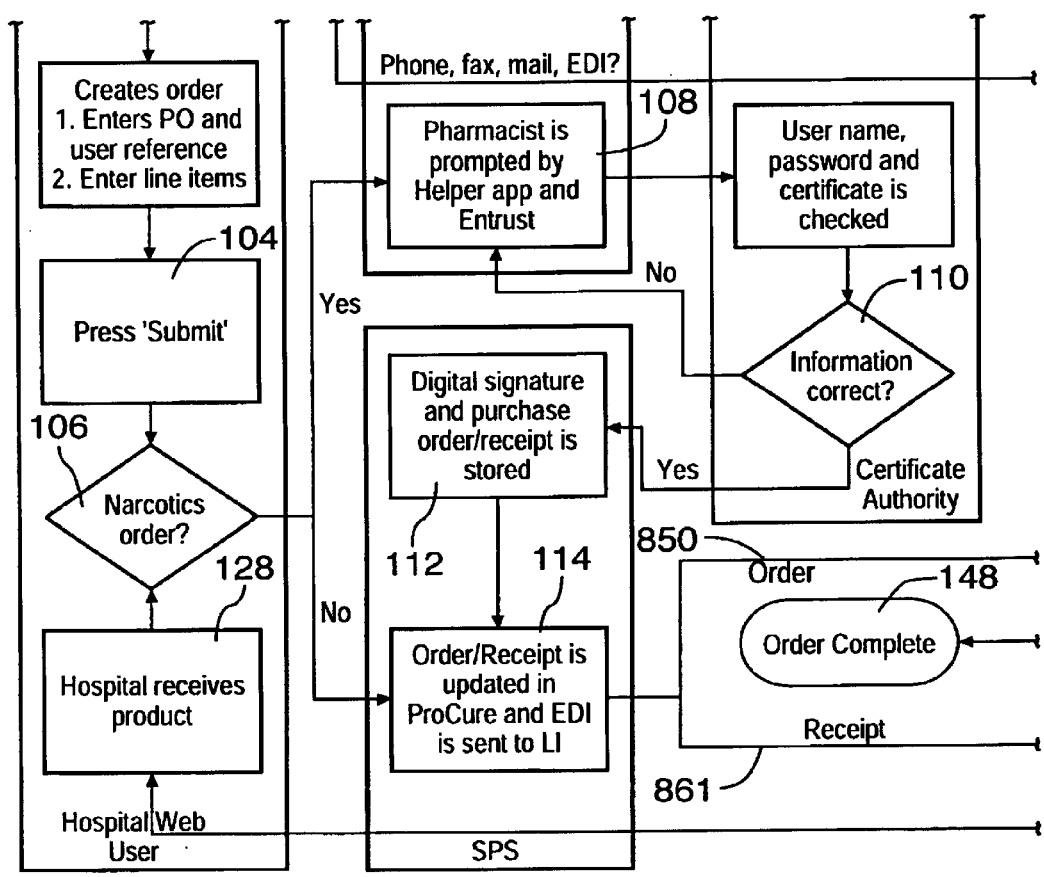
Figure 5D:
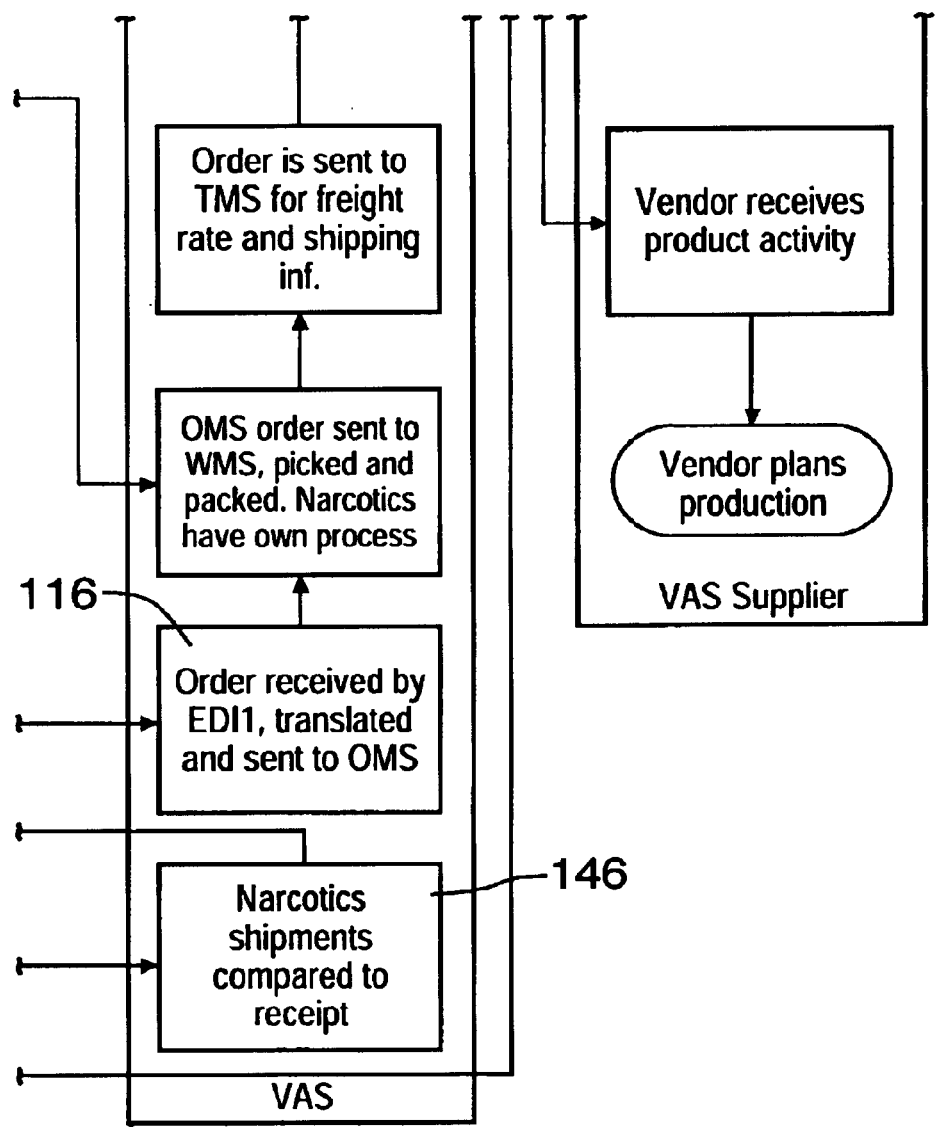

User systems 21, 22 and 23 and SPS 38 are generally configured in a thin client/server arrangement. Illustrated in FIG. 2 is a preferred embodiment 21' of user systems 21, 22 and 23. System 21' comprises a computing device 50 of the personal computer-type configured for Internet communication and capable of running a Java-enabled web browser 52 such as Microsoft® Internet Explorer or Netscape® Navigator. The term personal computer is used broadly incorporating workstations, portable computers, minicomputers, etc. In addition, user system 21' is configured for transmitting and receiving with SPS 38 and CA 40 using PKI decryption/encryption and digital signatures with certificates for private authenticated communications with integrity. In accordance with the preferred embodiment of FIG. 2, Entrust 3.0 client software 54 is used as a means for security. A web browser helper application 56 is also installed on user system 21' for assisting with user authentication and ordering as described further below. It is understood that user system 21' transparently communicates with CA 40 either directly as shown or via a TCP/IP redirector service 41 (FIG. 4). While user system 21' is shown directly connected to the Internet, it is understood that the system may connect through a LAN, Internet or other means provided adequate security measures are taken.

Figure 3:
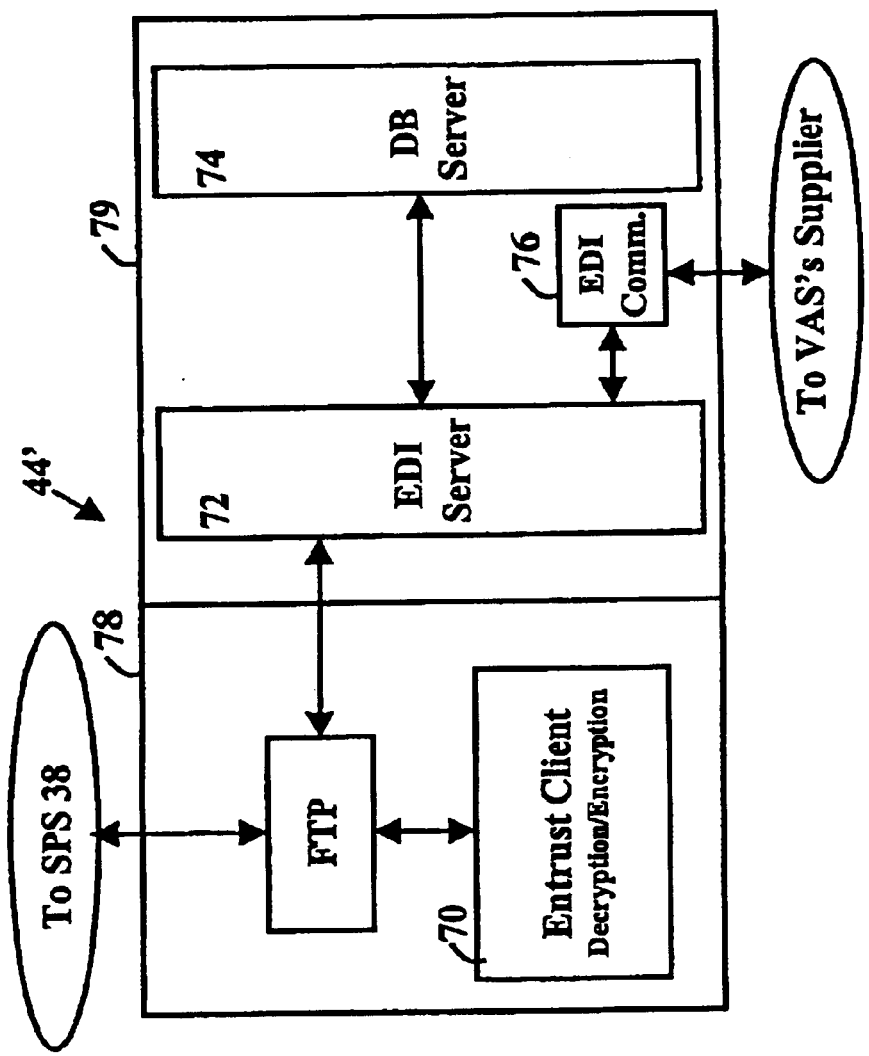
FIG. 3 is a general schematic representation of a value added supplier (VAS) supplier system in accordance with a preferred embodiment of the invention.

Further illustrated in FIG. 2 is a preferred SPS 38. In the preferred embodiment, SPS 38 comprises web server hardware and software such as a Compaq® Proliant 5000 Pentium Pro server running Microsoft® Windows NT operating system (not shown) and Netscape® Suitespot integrated software for the network enterprise (not shown). Further SPS 38 comprises a web server application 58 to generate HTML pages for transmission and also to receive user system communications for use within the system 25. Secure Socket Layer (SSL) technology provided by Suitespot is used to secure HTML communications between user system 21' web browser 52 and SPS 38 web application 58. Application 58 also generates ANSI X12 version 3060 EDI transaction sets for communication via file transfer protocol (FTP) 60 to supplier system 44 (FIG. 3). To facilitate digitally signed and secured ordering in a PKI environment with certificates throughout system 25, SPS 38 further comprises Entrust Client 3.0 62 as a means for security. FTP communications providing means for transmitting and receiving between SPS 38 and supplier 44 are also encrypted/decrypted using Entrust 62. SPS 38 further comprises DB Server 64 such as Oracle® or Microsoft® SQL for accessing databases (not shown) such as a supplier product catalog and a procurement transaction archive.

While not shown, it is preferred that SPS 38 communicates through an effective configured firewall to the open Internet 32 and user system 21'. It is also preferred that PB server resides on hardware isolated from the Internet. The data therein related to ordering should be encrypted. Web Application 58 source code should not reside on SPS 38. Preferably a redundant server and site should be made available to operate SPS 38 in a disaster scenario.

In order to provide physically secure service due to the nature of the transactions processed by SPS 38 particularly in relation to narcotic, controlled drug and controlled substance procuring, SPS 38 preferably is located in an approved secure facility and operated by approved personnel. The facility and personnel should meet regulatory or governmental security agency standards (for example in Canada, RCMP and in U.S., the NSA). Offsite storage vaults for storing backups of information should also be located in approved secure facilities. Similarly, CA 40 is preferably located in an appropriate secure facility and has a redundancy capability.

Optionally, but not shown, SPS 38 may be connected to a Credit Validation Server through a private network or over the Internet 32 for real-time on-line verification of a user's ability to purchase goods by credit card or other means. Typically, payment in a B2B purchase of narcotics and other controlled substances is invoiced by a supplier and is not sold by credit card.

Supplier system 44 may take many different forms depending, for example, on whether the supplier is an intermediary such as a value added supplier (VAS) providing sales and logistical services to one or more manufacturers/sellers or a direct supplier. FIG. 3 illustrates schematically a preferred supplier system 44' for a VAS. VAS system 44' comprises typically a hardware/software server configuration including a communications server implementing FTP 68 for communicating with SPS 38 and Entrust Client 70 for communication decryption/encryption service preferably in a PKI environment with certificates. System 44' further includes an EDI server 72 or interface to a legacy EDI system as a means for processing order transactions. Database server 74 is also included for a supply catalog (not shown) and for storing order transactions for reporting and audit purposes. The details of such an EDI processing system are not shown but are commonly understood. The system 72 may include an order management system (OMS), an inventory or warehouse management system (WMS) and a transportation management system (TMS) in cooperation to process an order and issue invoices, pick and pack items for shipping (not shown).

VAS system 44' further includes in the preferred embodiment an EDI communication interface 76 to one or more suppliers to VAS. It is understood that FTP 68 may be used to provide EDI communication service to suppliers to VAS. While system 44' is shown as an integrated system, it is understood that FTP server 78 may be separate from the remaining EDI processing system collectively indicated by reference 79. In turn, EDI server 72 and DB Server 74 may be configured on separate hardware.

FIGS. 5A–5D illustrate a high-level flowchart demonstrating the functionality of system 25 including initiating, processing, delivering, receiving and acknowledging receipt of an order; initiating a request for a digital certificate to permit use of system 25, and supplier order catalog updating.

Before an order for narcotics or other controlled substance may be successfully made using system 25 by user who is a qualified person such as a pharmacist having current and appropriate credentials to deal in such goods, the qualified person must make an application to a local regulatory authority (LRA) for user approval and certificate and public/private key generation in accordance with PKI procedures commonly understood in the art. A local regulatory authority may be a body that licenses or otherwise governs the applicant user or another trusted agency that may verify the applicant's credentials such as a VAS served by the system 25. With reference to FIG. 4 and steps 200 to 208 of FIG. 5A, a pharmacist desiring to take advantage of system 25 applies to LRA for permission to use system 25 and the provision of the necessary Entrust digital certificate and keys to make the pharmacist's user system 21' compliant with system 25. To approve such a request, LRA verifies the credentials in support of the application and requests a certificate from CA for approved applicants. Pharmacist initiates a certificate on user system 21' in cooperation with CA 40. Should a user's status as a qualified person change, making the user no longer qualified to deal in controlled substances, LRA may inform CA to suspend the user's certificate to prevent further ordering capabilities.

With reference to FIGS. 5A–5D, there is shown the steps by which an exemplary user at a hospital uses system 25 for procuring goods from VAS. It is clear from FIG. 4 that only when an order includes narcotics or other controlled substances that a pharmacist need be involved in the order process. Thus, system 25 integrates ordering goods subject to a verifiable chain of custody with ordering other products. Step 100 illustrates a user choosing to place an order electronically via system 21'. At step 102, User connects to SPS 38 login web page via the Internet 32 and logs in using a predefined user identity and password. As noted previously all such HTML communications between user system 21' and SPS 38 employ SSL technology for security to create user private procurement transactions.

Figure 6A:
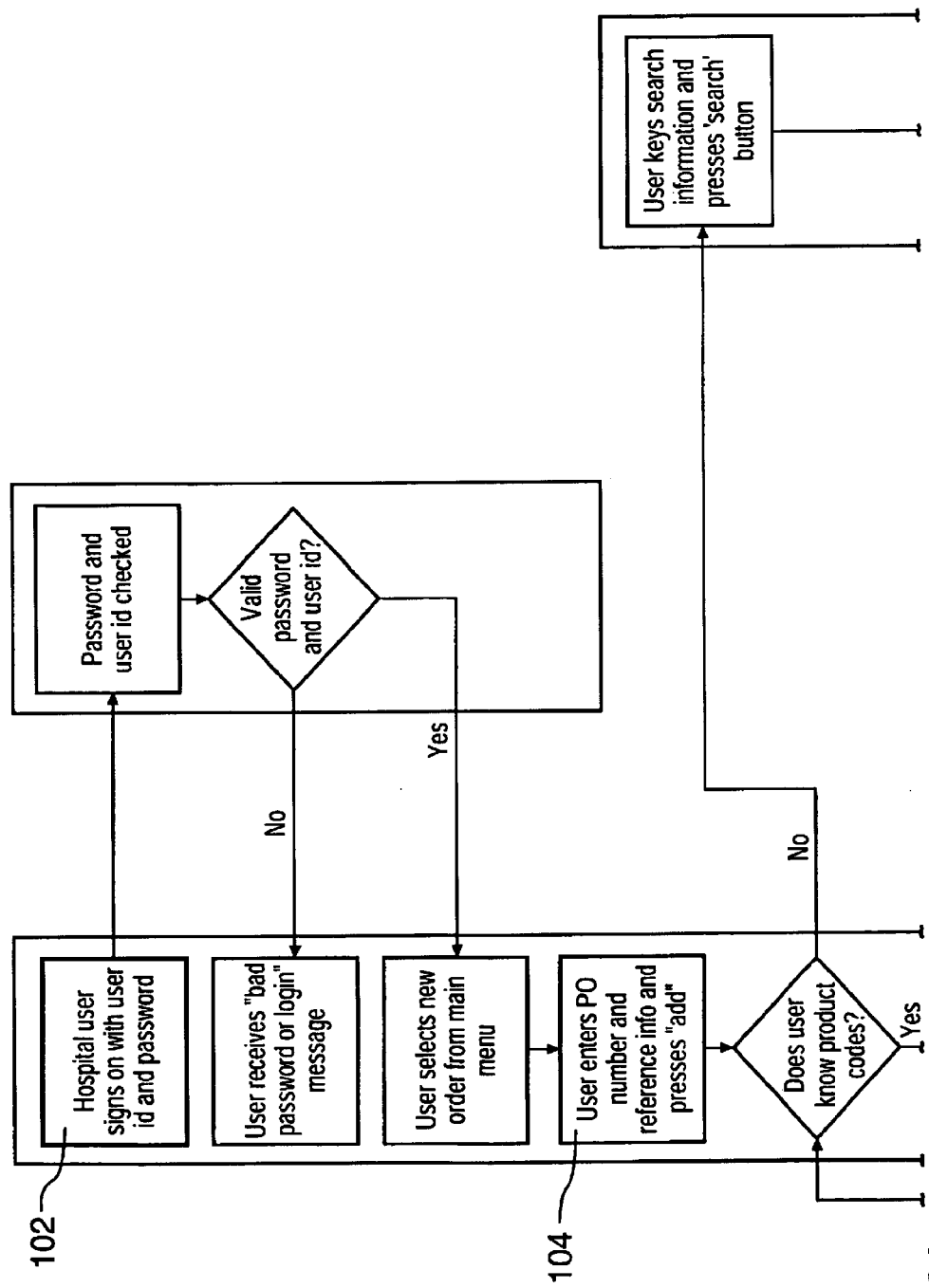
FIGS. 6A–6B show is a flowchart demonstrating the steps by which a purchase order may be initiated using a supplier catalog according to the preferred embodiment of FIG. 2 and FIG. 3.
Figure 6B:
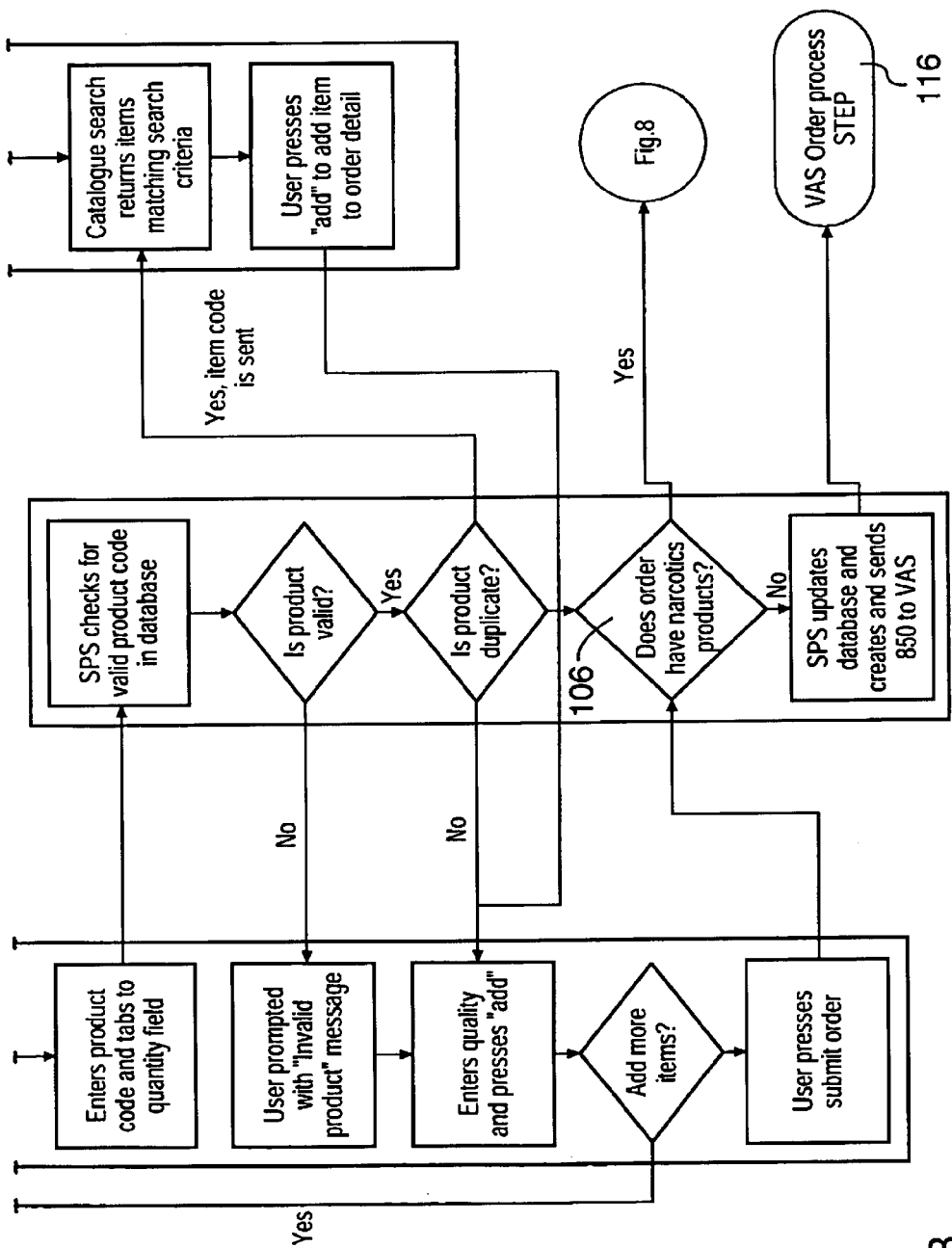

Once logged in, user creates an order, entering a purchase order number and user reference as well as line items and quantities to request at step 104. Reference may be had to FIGS. 6A–6B which illustrate in more detail a flowchart demonstrating the steps by which a purchase order may be initiated using a supplier catalog to select items, determine availability, etc, through SPS 38 as is well understood to persons skilled in the art.

Once the purchase order is completed and submitted, with reference again to FIGS. 5A–5D, SPS 38 determines if the order includes any narcotic or other controlled substances that are subject to ordering restrictions at step 106. For such an order, SPS 38 communicates with user pharmacist and Certificate Authority to authenticate pharmacist as entitled to order such goods. These steps are described in further detail with reference to FIGS. 8A–8D below. Briefly, pharmacist is prompted at step 108 to enter a further user identity and password to activate a personal digital signature and certificate through Entrust Client 54 for transmission to CA 40.

The qualified person entitled to order such goods must keep the user identity and password secret to avoid unauthorized use. If the order is validated to SPS 38 by CA 40 at step 110, SPS 38 stores the digitally signed order (step 112), and processes it for order information and formats and transmits an EDI 850 purchase order to VAS 44' (step 114).

As is well understood to those in the art, EDI messages are well defined by ANSI X12 standards in various versions (e.g. 3060, 3050 etc.) and individual messages are often referred to by an assigned message code. For example, an 850 message refers to a purchase order, an 861 message indicates confirmation of delivery of ordered goods and 832 indicates supplier catalog update information, etc.

VAS 44' receives the order via FTP 68, decrypts it and passes it on to EDI server 72 for processing (step 116). Once the order is processed, the goods are shipped to user at a "ship to address" registered in the VAS database server 74 for the qualified person listed in the purchase order (step 118). The ship to address is entered by the VAS at the time a relationship is established between VAS and its customer. The address is not included in the 850 message so that an address different from the user's address is not selectable by an unauthorized person using user system 21' to divert an order. Additionally, at step 126, EDI messages 820 and 867 may be sent by EDI interface 76 advising the supplier of the sale.

Figure 7A:
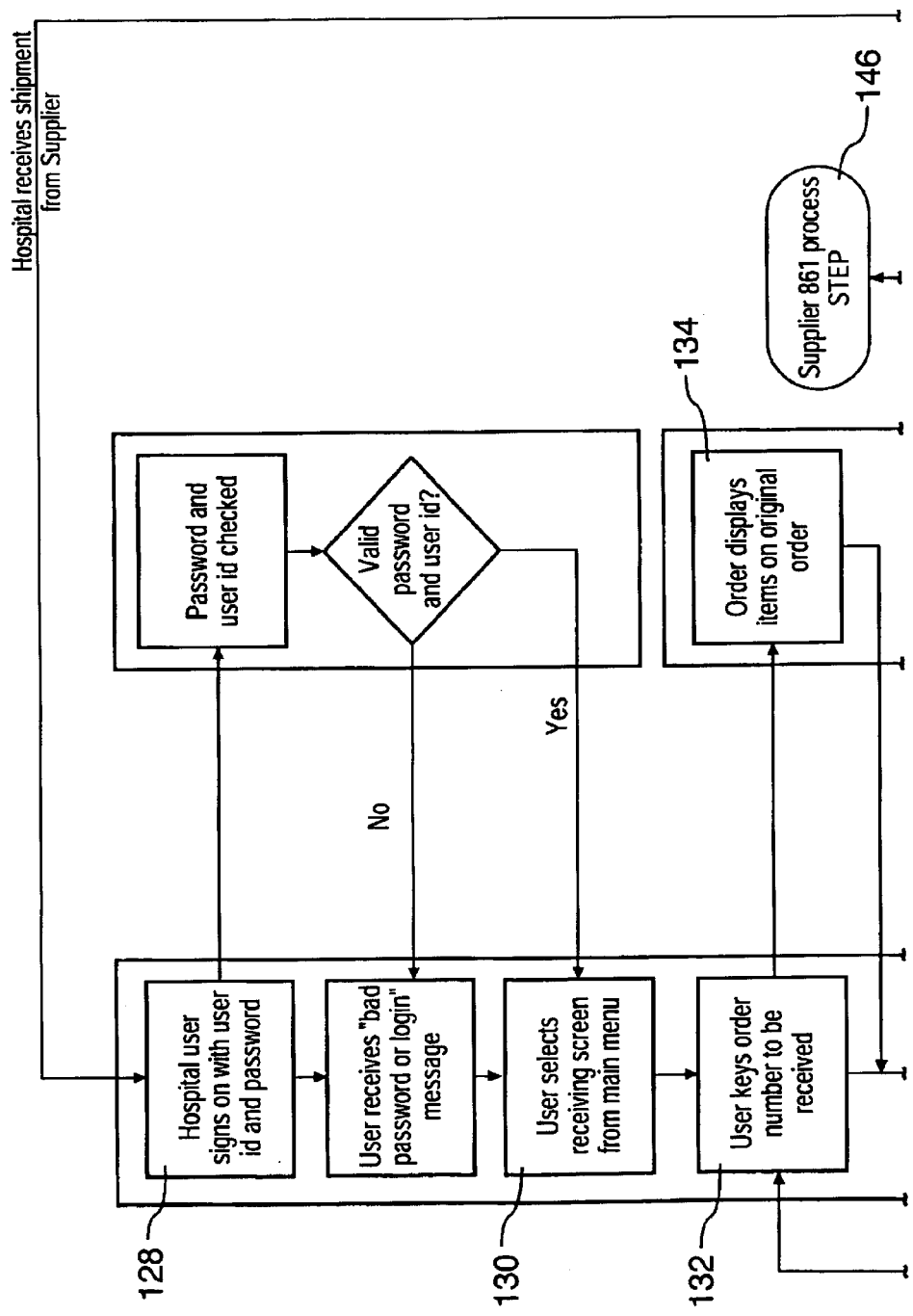
FIGS. 7A–7B show a flowchart showing the steps by which shipment of ordered product is processed according to the preferred embodiment of FIG. 2 and FIG. 3.
Figure 7B:
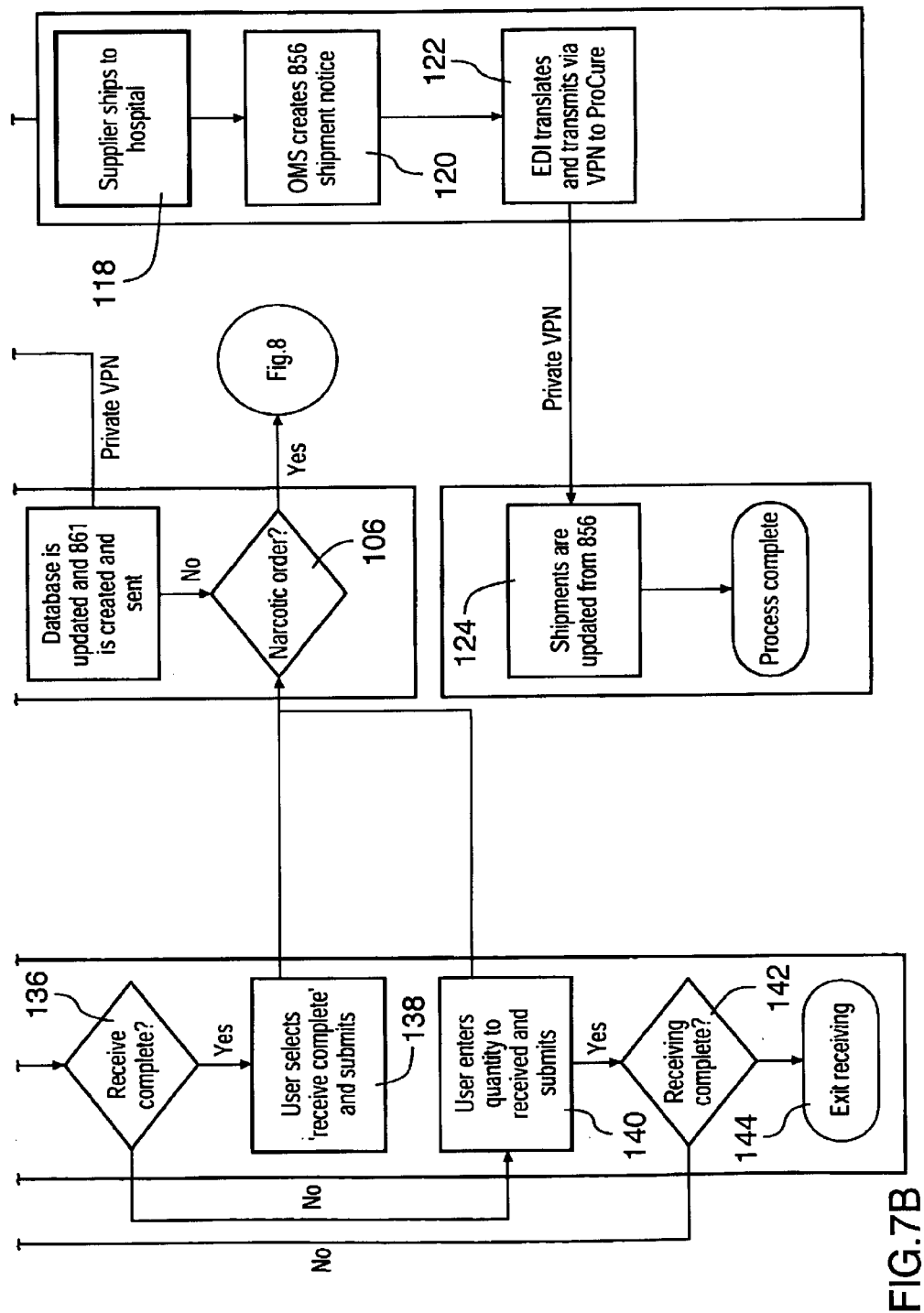
Figure 8A:
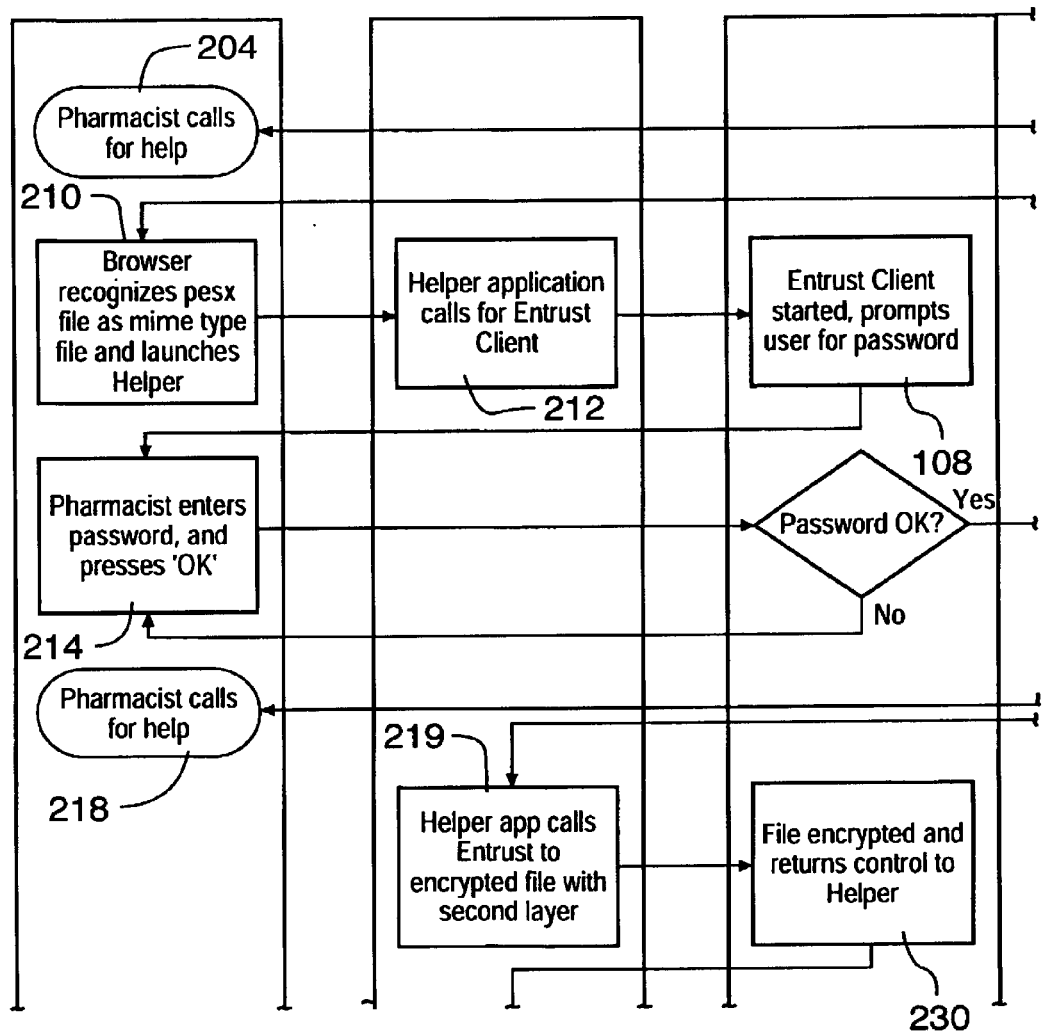
FIGS. 8A–8D show a flowchart demonstrating the signature process for narcotic or other controlled substances orders according to the preferred embodiment of FIG. 2 and FIG. 3.
Figure 8B:
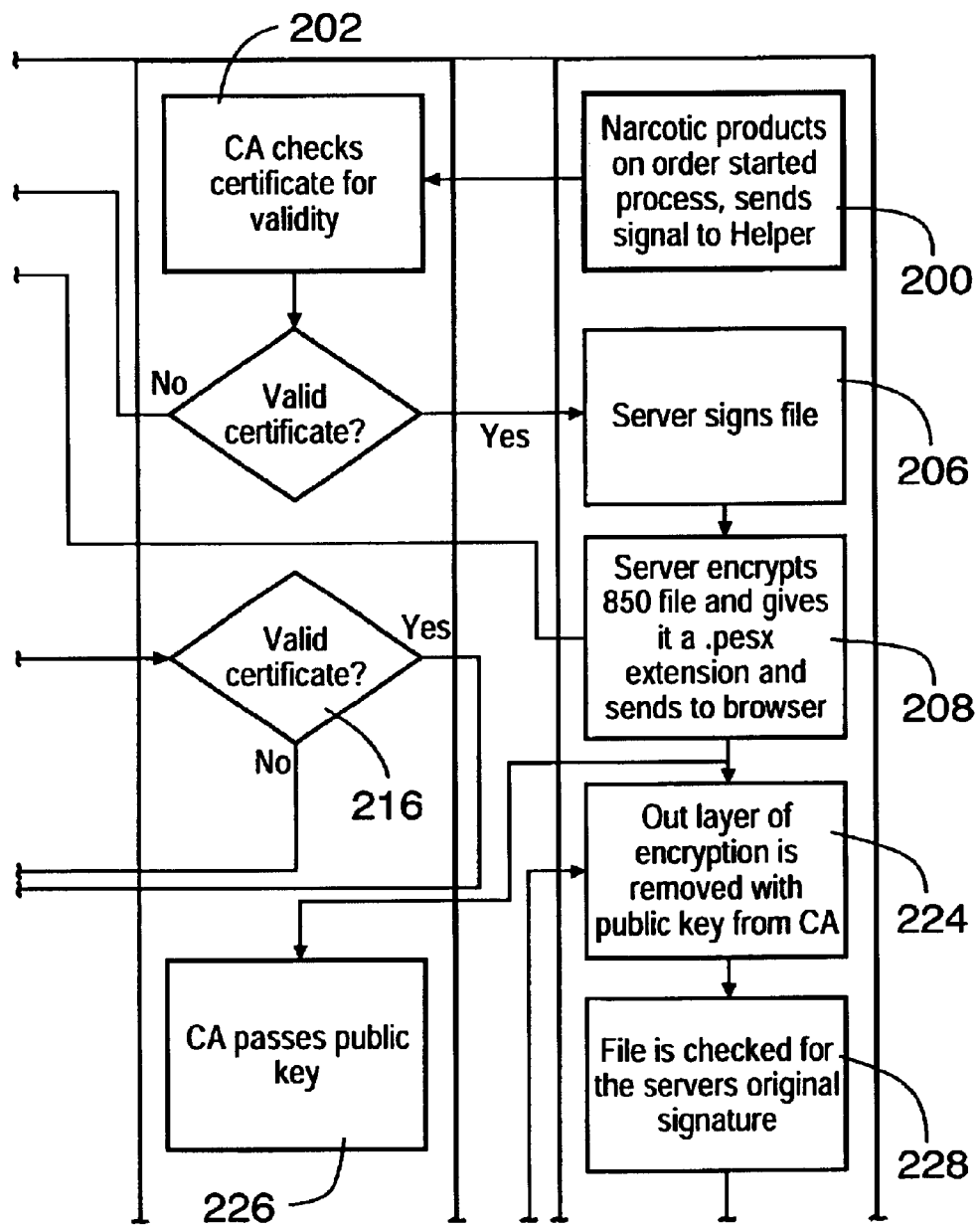
Figure 8C:
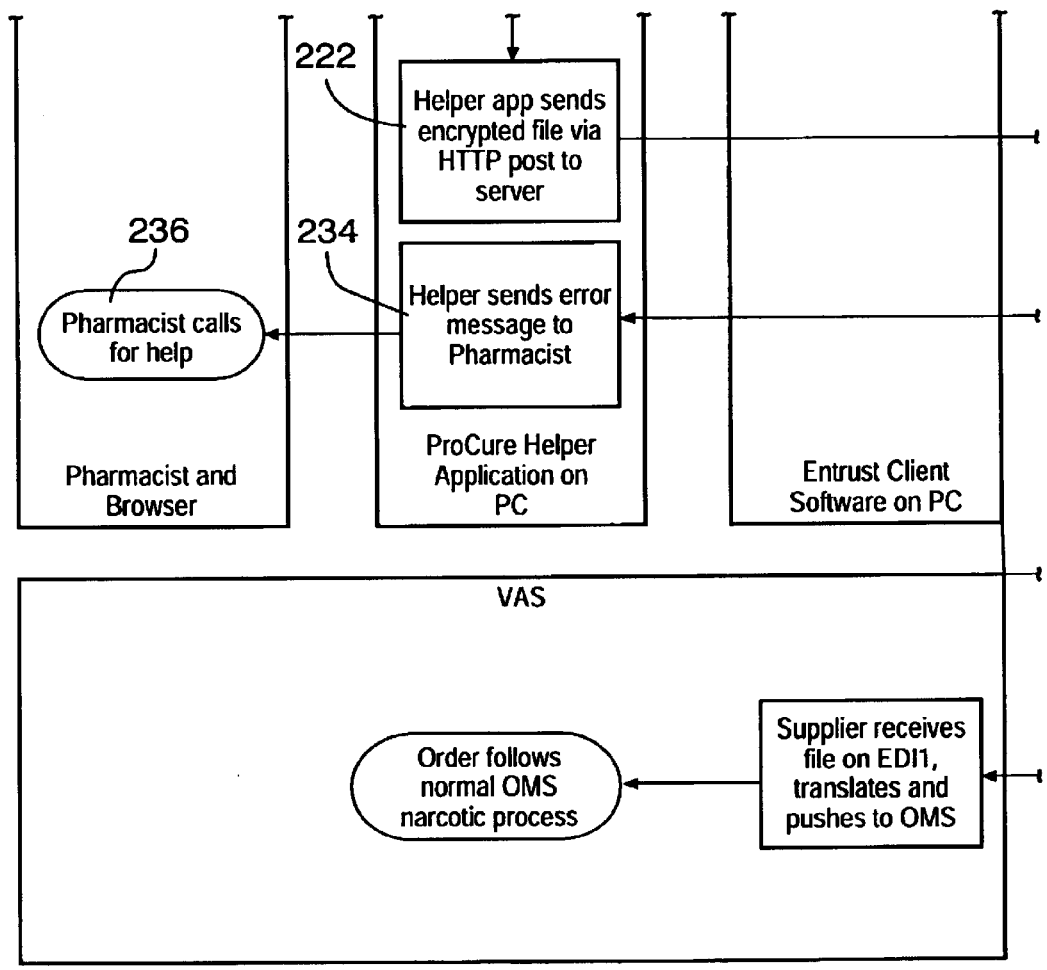
Figure 8D:
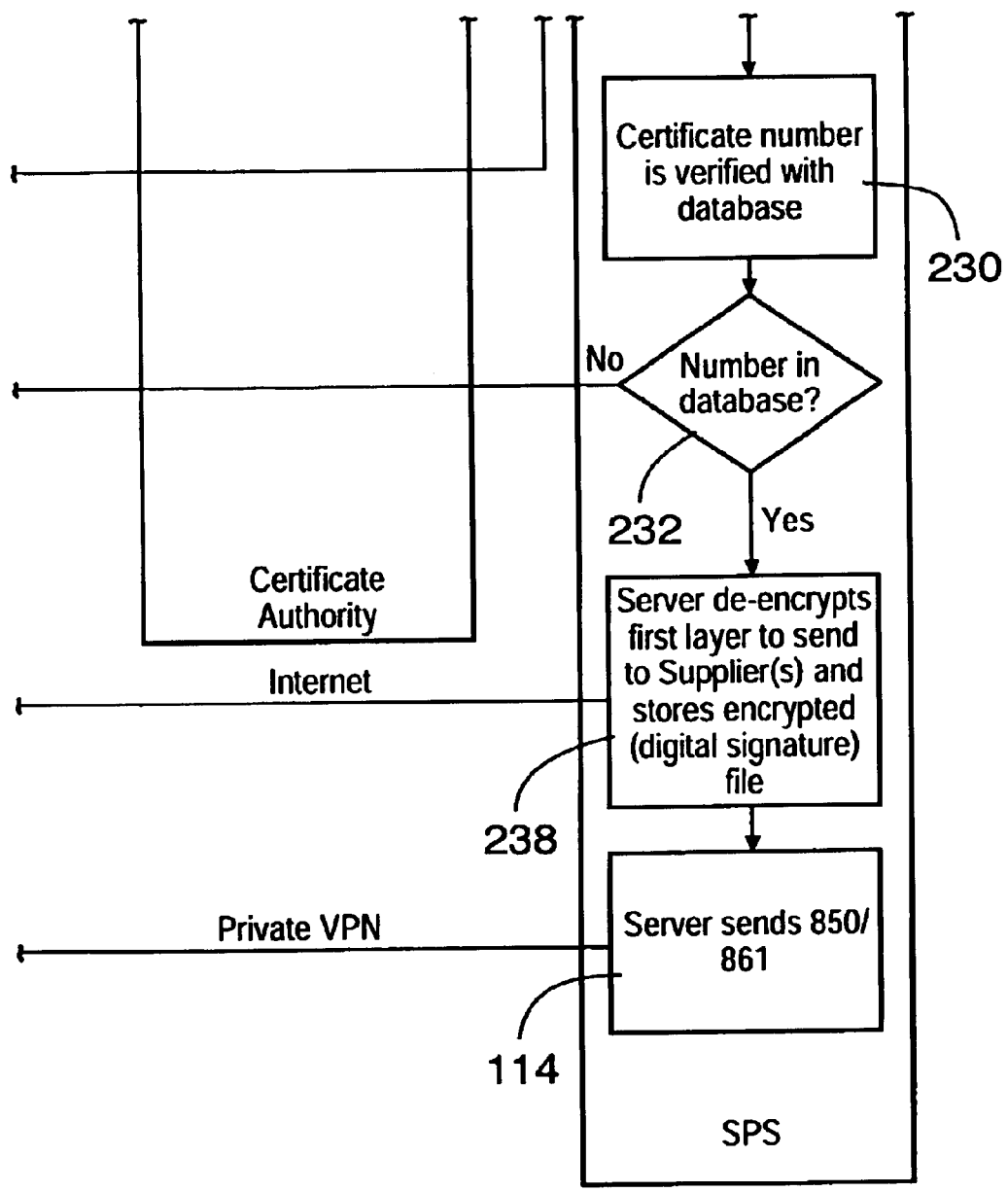

With reference to FIGS. 7A–7B showing a flowchart for steps to process an order shipment, following step 118 an advance shipment notice (EDI message 856) is also sent via FTP server 78 to SPS 38 advising of the shipment (steps 120 to 122). Supplier network link is preferably a VPN employing digital certificates with a certificate authority to provide private procurement transaction communications between VAS system 44' and SPS 38. SPS 38 uses the receipt of an 856 message (step 124) that indicates shipment of narcotic or other controlled substances to begin a count down timer within which time the user must initiate a 861 message acknowledging receipt of the shipment in a manner discussed below.

According to business rules implemented by SPS 38, if a 856 message is not properly confirmed by the qualified person to whom the product was shipped with a digitally signed and certified 861 message, further orders for narcotics or other controlled substances will be denied pending a satisfactory resolution. The 861 message must be received by SPS 38 within a predefined period of time. Currently the defined period is five days under the Canadian regulatory framework. Additional rules ensure that variances between quantity shipped and quantity confirmed received are promptly noted to VAS or a regulatory authority (eg. DEA).

Following the shipment of the ordered product to the user at the hospital, the hospital receives the shipment at step 128 and user logs into SPS 38. For orders including narcotic or other controlled substance product, it is necessary for the qualified person who ordered such product to timely acknowledge its receipt. Once logged into SPS 38, user selects a screen to process the receipt of an order and enters a product order reference number (steps 130–132). SPS 38 retrieves order information using the reference number from database server 64 for displaying to the user at step 134. The user compares the product received to the order (step 136) and either confirms receipt (step 138) or enters the actual quantity received to SPS 38 (step 140). User may choose to repeat the confirmation process for additional orders (step 142) or exit the confirmation process (step 144). On the SPS 38 side, the confirmed receipt information is processed in a manner similar to an original order (step 106, FIG. 5C).

If the received product includes narcotic or other controlled substances, the qualified person who ordered the product must digitally sign and certify its receipt to SPS 38 using CA 40 (steps 106 to 110). SPS 38 stores the receipt and performs any necessary business rule processing to ensure message 856 is matched to its confirmation 861 message thus permitting continued ordering rights. EDI message 861 is formatted and transmitted to VAS system 44' (step 114) to conform that system's records (step 146) and thus close the chain of custody procurement (step 148).

There is shown in more detail in FIGS. 8A–8D a flowchart demonstrating the steps for signing orders or receipts for narcotics or other controlled substances by an exemplary user, namely a pharmacist at a hospital. The flow is described with reference to signing a 850 order but it is understood that processing a 861 confirmation receipt is comparably. At step 200, SPS 38 receives an order from user system 21' for narcotics or other controlled substances and requests CA 40 to verify SPS 38 certificate that SPS 38 will use to sign the formatted 850 order (step 202). If the certificate is not validated, the pharmacist is informed and may call for assistance (step 204). If the certificate is validated, SPS 38 signs the 850 order, encrypts it and sends it to pharmacist's web browser 52 with a web helper app 56 triggering name (e.g. MIME extension .pesx) at steps 206 to 208. Upon recognition of the MIME extension by browser 52, helper app 56 is initiated and in turn calls Entrust Client 54 (steps 210 to 212).

As described earlier with reference to FIG. 5C at step 108, Entrust Client 54 prompts the pharmacist for a user identity and password for validation. Following successful entry of the requested information by the pharmacist (step 214), Entrust Client 54 communicates with CA 40 to validate the pharmacist's digital certificate (step 216). If the certificate is not valid, the pharmacist is informed and may call for assistance (step 218). As indicated by steps 219–222, provided the pharmacist's certificate is valid, helper app 52 calls Entrust Client 54 to sign and encrypt the .pesx file containing the 850 order for return to SPS 38. Upon receipt of the twice signed and encrypted 850 order, at steps 224–228, SPS 38 removes the outer layer of encryption with the public key retrieved from CA 40. The file is checked for SPS's signature added at step 206 to ensure there file is an original comparing the certificate stored at SPS 38 with that received. The pharmacist user may be notified of any error for the pharmacist's follow-up (steps 230 to 236). For a file having a matched certificate, SPS 38 decrypts the first encryption layer on the file to remove SPS 38 encryption performed at step 208 and stores an encrypted pharmacist digital signature file as a record of the transaction (step 238). As described earlier with reference to FIG. 5C, at step 114, SPS 38 thereafter sends an appropriate 850 message to VAS system 44'.

All products available for order using system 25 are stored in a supplier catalog database at SPS 38 accessible via DB server 64. The database may be updated using the EDI message interface (FTP server 78) from VAS and VAS Supplier generated EDI 832 update messages. With reference to FIGS. 5A–5D, there is demonstrated the steps to update the supplier catalog database. In the preferred embodiment of FIG. 2 and FIG. 3, following the internal updating of a supply catalog (whether digitally stored or not) at a supplier to VAS, at step 300, VAS supplier sends product information to VAS who in turn communicates via FTP the catalog update information in the form of an encrypted EDI 832 message to SPS 38 (step 302). SPS 38 receives the information via FTP 60, decrypts same and updates the catalog server database through DB Server 64 (steps 304 and 306).

Thus, through use of digitally signed and encrypted communications through Certification Authority 40, user system 21' and SPS 38 may produce secure authenticated orders and receipts incorporating non-repudiation technology to provide guarantees that a particular transaction has taken place as between a user and supplier.

From a user's front-end perspective, the present invention provides the following advantages:

Orders can be created and receipt of product confirmed using any standard web browser, eliminating the need for additional complex end user software;

Assurance that an order is private;

Users usually require zero training and little or no on-going support;

Orders can be placed/received 7/24/365;

The amount of time spent placing orders is significantly reduced because the system is simple and easy-to-use;

Errors are virtually eliminated as catalogue, pricing and other information is always up-to-date and the procurement system will not accept orders for non-listed catalogue items; and A Pharmacist can permit others to prepare orders yet know only the pharmacist can approve an order for narcotics or controlled drugs.

From a supplier's back-end perspective the present invention offers the following advantages:

Orders can be automatically processed by any legacy application and sent directly to a picker or receiver on a warehouse floor or to a transportation company;

The service enables connectivity of disparate legacy systems over the Internet, which historically was only available to organizations utilizing a VAN;

All relevant information pertaining to an electronic order can easily be shared between all participants in an organization's supply chain;

Paper catalogues no longer need to be printed and distributed;

Only valid orders are accepted as all entries are cross-referenced against an on-line catalogue, significantly reducing processing costs and the costs associated with handling returns;

Market reach can be extended as the present invention makes it economical to receive orders from customers who are distant, small and technically limited;

The number of telephone order status queries can be dramatically reduced as better and more up-to-date information, including real-time information regarding delivery schedules, can be placed in the hands of trading partners and customers;

Opportunity for channel reconfiguration as organizations can cost effectively sell directly to consumers, compressing the length of their supply chains and eliminating any unnecessary intermediaries;

Verified chain of custody order and fulfillment;

Verification of user's identity;

Assurance that transaction received is identical to that sent;

Proof that a transaction actually took place between identified parties; and

Discrepancies between quantity shipped and received or failed confirmations notified.

The embodiments of the invention described above are intended to be exemplary only. The scope of the invention is therefore intended to be limited solely by the scope of the appended claims.

We claim:

1. An electronic commerce system for procuring goods/services subject to a chain of custody when transferred from a supplier to a user, comprising:

a user system for procuring the goods by the user comprising:

means for electronically receiving and transmitting user private procurement transactions; and security means operable only by the user for authenticating electronically said user private procurement transactions comprising orders and confirmations of receipt in a non-repudiatable manner to the secure procurement processor;

a supplier system for supplying the goods for procuring by the user comprising:

means for electronically receiving authenticated user private procurement transactions and transmitting supplier private procurement transactions comprising notification of provision of goods/services;

a secure procurement system comprising:

user system communication means for transmitting and receiving the user private procurement transactions with the user system;

supplier system communication means for transmitting and receiving the supplier private procurement transactions with the supplier system;

security means for receiving authentication of said user private procurement transactions and for authenticating electronically said user private procurement transactions comprising orders and confirmations of receipt as the secure procurement system's transactions in a non-repudiatable manner;

a database server for storing said authenticated private procurement transactions and said notifications and for storing a product catalog representing said goods from the supplier available for procuring by a user;

a procurement transaction processor for processing said private procurement transactions transmitted and received between the user and the supplier, wherein said procurement transaction processor includes:

means for performing business rules analysis using the order, notification or confirmation of receipt;

means for detecting controlled substances; and means for alarming potential instances of diversion or loss of controlled substances;

wherein upon receiving a notification of provision of controlled substances at the secure procurement system the means for performing business rules analysis and means for alarming initiate a timer for a predetermined period of time within which to receive the confirmation of receipt of the controlled substances corresponding to the notification, and when the timer expires, alarm a potential instance of diversion or loss of controlled substances and prevent further orders from the user;

a certificate authority for facilitating the authentication electronically of said user private procurement transactions comprising orders and confirmations of receipt in a non-repudiatable manner;

a network connection linking the user system, secure procurement system and certificate authority; and supplier network connection linking the supplier system and secure procurement system;

whereby the secure procurement system, in cooperation with the certificate authority, processes and stores said orders, notifications, and confirmations of receipt to provide a verifiable chain of custody for controlled substances procured by the user, and the secure procurement system communicates with the user and the certificate authority to authenticate that the user is entitled to order said controlled substances'.

2. The system of claim 1 wherein the notification of provision includes a count of the quantity of the goods/services provided and the confirmation of receipt includes a count of the quantity of the goods/services received and wherein the means for performing business rules analysis and means for alarming are configured to:

Upon receiving the confirmation of receipt at the secure procurement system:
Compare the count from the confirmation of receipt to the count from the corresponding notification;
If there is a discrepancy, alarm a potential instance of diversion or loss of goods/services.

3. The system according to claim 1 wherein the user system security means includes a certificate from the certificate authority for authenticating user to the secure procurement system.

4. The system according to claim 1 wherein the secure procurement system security means includes a certificate from the certificate authority for authenticating the secure procurement system to the user.

5. The system according to claim 1 wherein the certificate authority comprises means for generating encryption/decryption key pairs unique to each user and the secure procurement system to enable encryption/decryption, integrity and authentication of transmitted user private procurement transactions between said user and secure procurement system.

6. The system of claim 1 wherein the supplier system includes means for processing user orders.

7. The system of claim 6 where the supplier system includes means to interface to a legacy supplier order system.

8. The system of claim 1 wherein the supplier system includes a database for storing the user's ship to address for provision of said goods/services to the user and wherein any user ship to address in the user order is ignored.

9. The system of claim 1 wherein the goods are chosen from the group of narcotics, controlled drugs and controlled substances.

10. The system of claim 1 wherein the network connection connects the user system and secure processor system over the Internet.

11. A secure procurement system for procuring goods/services subject to a chain of custody when transferred from a supplier to a user, comprising:

a supplier network connection for connecting the secure procurement system and a supplier system;

a network connection for connecting the secure procurement system to a user system;

user system communication means for transmitting and receiving user private procurement transactions;

a supplier system communication means for transmitting and receiving supplier private procurement transactions with the supplier system;

security means for receiving authentication of said user private procurement transactions and for authenticating electronically said user private procurement transactions comprising orders and confirmations of receipt as the secure procurement system's transactions in a non-repudiatable manner;

a database server for storing said authenticated private procurement transactions and said notifications and for storing a product catalog representing said goods from the supplier available for procuring by a user;

and a procurement transaction processor for processing said private procurement transactions transmitted and received between the user and the supplier, wherein the procurement transaction processor comprises means for performing business rules analysis using the order, notification or confirmation of receipt, means for detecting controlled substances, and means for alarming potential instances of diversion or loss of controlled substances;

upon receiving a notification of provision of controlled substances at the secure procurement system the means for performing business rules analysis and means for alarming:

initiate a timer for a predetermined period of time within which to receive the confirmation of receipt of the of the controlled substances corresponding to the notification, and when the timer expires, alarm a potential instance of diversion or loss of controlled substances and prevent further orders from the user, whereby the secure procurement system in cooperation with a certificate authority processes and stores said orders, notifications, and confirmations of receipt to provide a verifiable chain of custody for controlled substances procured by the user, and the secure procurement system communicates with the user and the certificate authority to authenticate that the user is entitled to order said controlled substances.

12. The system of claim 11 wherein the notification of provision includes a count of the quantity of the goods/services provided and the confirmation of receipt includes a count of the quantity of the goods/services received and wherein the means for performing business rules analysis and means for alarming are configured to:

Upon receiving the confirmation of receipt at the secure procurement system:
Compare the count from the confirmation of receipt to the count from the corresponding notification;
If there is a discrepancy, alarm a potential instance of diversion or loss of goods/services.

13. The system according to claim 11 wherein the user system security means includes a certificate from the certificate authority for authenticating user to the secure procurement system.

14. The system according to claim 11 wherein the secure procurement system security means further comprises a certificate from the certificate authority for authenticating the secure procurement system to the user.

15. The system according to claim 11 wherein the certificate authority comprises means for generating encryption/decryption key pairs unique to each user and the secure procurement system to enable encryption/decryption, integrity and authentication of transmitted secure user procurement transactions between said user and secure procurement system.

16. The system of claim 11 wherein the goods are chosen from the group of narcotics, controlled drugs and controlled substances.

17. The system of claim 11 wherein the network connection connects the user system and secure processor system over the Internet.

18. A method of procuring goods/services subject to a chain of custody when transferred from a supplier to a user, comprising:

Connecting a user at a user system to a secure procurement system over a network and authenticating the user as an authorized user, the secure procurement system having a supplier catalog of said goods/services available for procuring;

Transmitting from the user system and receiving at the secure procurement system a private order from the user for said goods/services and verifying the user's order in a non-repudiatable manner with a certificate authority, and authenticating that the user is entitled to order said goods/services;

Storing the verified order in a procurement transaction database and transmitting from the secure procurement system and receiving at a supplier system the order over a supplier network;

Providing the goods/services to the user and transmitting from the supplier system and receiving at the secure procurement system a secure notification of the provision;

Storing the notification in the procurement transaction database and transmitting from the secure procurement system and receiving at the user system the notification;

Receiving the goods/service by the user;

Transmitting from the user system and receiving at the secure procurement system a secure confirmation of receipt of the goods/services from the user and verifying the user's receipt in a non-repudiatable manner;

Performing business rules analysis by the secure procurement system using the order, notification or confirmation of receipt wherein the step of performing business rules analysis comprises the steps of:

determining the presence of goods/services that comprise controlled substances;

initiating a timer, upon receiving a notification of provision of controlled substances at the secure procurement system, for a predetermined period of time within which to receive the confirmation of receipt of the controlled substances corresponding to the notification, and when the timer expires, alarming a potential instance of diversion or loss and preventing further orders from the user; and Storing the verified secure receipt in a procurement transaction database and transmitting from the secure procurement system and receiving at a supplier system the receipt.

19. The method of claim 18 wherein the notification of provision includes a count of the quantity of the goods/services provided and the confirmation of receipt includes a count of the quantity of the goods/services received and wherein the step of performing business rules analysis comprises the steps of:

Upon receiving the confirmation of receipt at the secure procurement system:

Comparing the count from the confirmation of receipt to the count from the corresponding notification;

If there is a discrepancy, alarming a potential instance of diversion or loss provision of goods/services.

20. The method of claim 18 further including the steps of establishing the user as an authorized user to use the secure procurement system by verifying the user's rights to receive the goods in the supplier catalog with a body regulating those rights.

21. The method of claim 18 wherein the network connecting the user system and secure procurement system is the Internet.

22. The method of claim 18 wherein the supplier network connecting the secure procurement system and the supplier system is a virtual private network.

23. The method of claim 18 further including the step of formatting the secure order and secure confirmation of receipt into ANSI EDI format prior to transmitting to the supplier system.

24. The method of claim 18 wherein the goods/service are provided to the user's address from a shipping address database at the supplier system without regard for any address information in the user order.

25. The method of claim 18 further including the step of transmitting from the secure procurement system and receiving at the user system the notification of provision.

26. A method for procuring goods/services subject to a chain of custody when transferred from a supplier to a user comprising the steps of:

Connecting a secure procurement system to a user system over a network and authenticating a user at the user system as an authorized user, the secure procurement system having a supplier catalog of said goods/services available for procuring;

Receiving at the secure procurement system a secure order from the user for said goods/services, the user's order verified in a non-repudiatable manner;

Receiving at the secure procurement system authentication that the user is entitled to order said goods/services;

Storing the verified secure order in a procurement transaction database and transmitting from the secure procurement system to a supplier system the order over a supplier network;

Receiving at the secure procurement systems from the supplier system a private notification of the provision;

Storing the notification in the procurement transaction database and transmitting from the secure procurement system to the user system the notification;

Receiving at the secure procurement system from the user system a private confirmation of receipt of the goods/services from the user, the confirmation of receipt verified in a non-repudiatable manner;

Performing business rules analysis by the secure procurement system of the transactions in the procurement transactions database, wherein the step of performing business rules analysis comprises the steps of:

determining the presence of goods/services that comprise controlled substances;

initiating a timer, upon receiving a notification of provision of controlled substances at the secure procurement system, for a predetermined period of time within which to receive the confirmation of receipt of the controlled substances corresponding to the notification, and when the timer expires, alarming a potential instance of diversion or loss and preventing further orders from the user; and Storing the verified receipt in a procurement transaction database and transmitting from the secure procurement system to the supplier system the receipt.

27. The method of claim 26 wherein the notification of provision includes a count of the quantity of the goods/services provided and the confirmation of receipt includes a count of the quantity of the goods/services received and wherein the step of performing business rules analysis comprises the steps of:

Upon receiving the confirmation of receipt at the secure procurement system:
Comparing the count from the confirmation of receipt to the count from the corresponding notification;
If there is a discrepancy, alarming a potential instance of diversion or loss provision of goods/services.

28. The method of claim 26 further including the steps of establishing the user as an authorized user to use the secure procurement system by verifying the user's rights to receive the goods in the supplier catalog with a body regulating those rights.

29. The method of claim 26 wherein the network connecting the user system and secure procurement system is the Internet.

30. The method of claim 26 wherein the supplier network connecting the secure procurement system and the supplier system is a virtual private network.

31. The method of claim 26 further including the step of formatting the order and confirmation of receipt into ANSI EDI format prior to transmitting to the supplier system.

* * * * *